(12) United States Patent
Beyeler et al.

(10) Patent No.: US 11,307,125 B2
(45) Date of Patent: Apr. 19, 2022

(54) MEMS NANOINDENTER CHIP WITH INDENTER PROBE AND REFERENCE PROBE

(71) Applicant: FEMTOTOOLS AG, Buchs (CH)

(72) Inventors: David Beyeler, Daellikon (CH); Simon Muntwyler, Zurich (CH); Felix Beyeler, Ruemlang (CH)

(73) Assignee: FemtoTools AG, Buchs (CH)

( * ) Notice: Subject to any disclaimer, the term of this patent is extended or adjusted under 35 U.S.C. 154(b) by 420 days.

(21) Appl. No.: 16/196,145

(22) Filed: Nov. 20, 2018

(65) Prior Publication Data

US 2019/0154556 A1 May 23, 2019

(30) Foreign Application Priority Data

Nov. 22, 2017 (EP) ..................................... 17203114

(51) Int. Cl.
*G01N 3/42* (2006.01)
*G01Q 60/36* (2010.01)

(52) U.S. Cl.
CPC ............. *G01N 3/42* (2013.01); *G01Q 60/366* (2013.01); *G01N 2203/0286* (2013.01)

(58) Field of Classification Search
CPC .... G01N 3/40; G01N 3/42; G01N 2203/0286; G01Q 60/366
See application file for complete search history.

(56) References Cited

U.S. PATENT DOCUMENTS

| 6,679,130 | B2 * | 1/2004 | Hajduk ................. B01L 3/5085 73/54.02 |
| 7,654,159 | B2 | 2/2010 | Enoksson et al. |
| 7,685,868 | B2 | 3/2010 | Woigard et al. |
| 8,161,803 | B2 | 4/2012 | Oh et al. |
| 9,535,086 | B2 | 1/2017 | Beyeler et al. |
| 2007/0180924 | A1 | 8/2007 | Warren et al. |
| 2011/0026559 | A1 | 2/2011 | Bagshaw et al. |
| 2015/0369839 | A1 * | 12/2015 | Beyeler ............... G01Q 60/366 850/5 |
| 2016/0153881 | A1 * | 6/2016 | Bellaton .............. G01Q 60/366 73/82 |

OTHER PUBLICATIONS

A.V. Desai, et al.; "A novel MEMS nano-tribometer for dynamic testing in-situ in SEM and TEM"; Tribology Letters; Jan. 2005; pp. 13-19; vol. 18, No. 1; Springer Science+Business Media, Inc.

(Continued)

*Primary Examiner* — Erika J Villaluna
(74) *Attorney, Agent, or Firm* — Laurence A. Greenberg; Werner H. Stemer; Ralph E. Locher

(57) ABSTRACT

A MEMS-nanoindenter chip performs nanoindentation on a specimen. The MEMS-nanoindenter chip has an intender probe joined with an indenter tip. The indenter tip indents into the specimen. A reference probe is joined with a reference tip, the reference tip touches the specimen. Sensing capabilities are provided to measure the position of the indenter probe relative to the reference probe. The MEMS-nanoindenter chip enables highly accurate measurements since the frame stiffness is not part of the measurement chain any more. Furthermore, thermal drift during the nanoindentation is considerably reduced.

13 Claims, 8 Drawing Sheets

(56) References Cited

OTHER PUBLICATIONS

Alexandra Nafari, et al; "A Micromachined Nanoindentation Force Sensor"; Actuator; 2005; pp. 123-124.
Yu Sun, et al.; "A bulk microfabricated multi-axis capacitive cellular force sensor using transverse comb drives"; Journal of Micromechanics and Microengineering; 2002; pp. 832-840; Institute of Physics Publishing.
Yu Sun, et al.; "A Novel Dual-Axis Electrostatic Microactuation Systrem for Micromanipulation"; Intl. Conference on Intelligent Robots and Systems; Oct. 2002; pp. 1796-1801; IEEE.

\* cited by examiner

MEMS NANOINDENTER CHIP WITH INDENTER PROBE AND REFERENCE PROBE

CROSS-REFERENCE TO RELATED APPLICATION

This application claims the priority, under 35 U.S.C. § 119, of European application EP 17203114.8, filed Nov. 22, 2017; the prior application is herewith incorporated by reference in its entirety.

BACKGROUND OF THE INVENTION

Field of the Invention

The present invention relates to MEMS Nanoindenter Chip according to the main independent claim.

In an indentation test a hard tip is pressed into a specimen with unknown mechanical properties. The tip is further pushed into to the specimen until a user-defined force or a user-defined displacement has been reached. Mechanical properties such as hardness, Young's Modulus, creep, stress relaxation, storage modulus, loss modulus, yield strength, fracture toughness etc. can be calculated based on the force-displacement data that is measured by the nanoindenter during the nanoindentation test.

In comparison to typical microindentation with indents in the micrometer range, nanoindentation requires a significantly smaller force and size-scale. Typical indentation depths are in the sub-micrometer range and the depth is measured with sub-nanometer resolution. The indentation forces are typically in the range of micronewtons to millinewtons. The small indentation depths as well as the small force range are a great technical challenge that requires sophisticated and expensive nanoindentation equipment to yield accurate data. Two main challenges are:

i) The nanoindentation system has to be built very stiff to accurately measure indentation depths on hard materials in the sub-micrometer range. If the so called "frame stiffness" of the system is too low or not constant in the whole working area of the nanoindentation system, the measurements are inaccurate or meaningless. Components of the nanoindentation system that lower the frame stiffness are usually the nanoindentation rig, the actuators for specimen positioning and for the actual nanoindentation as well as the force sensor that is measuring the load during the nanoindentation.

ii) Expansion and contraction induced by thermal variations induce errors into the measurement. The reason for this "thermal drift" is the large size of the nanoindentation systems (the size of the frame of the nanoindentation system is typically in the range of 10 cm to 100 cm) compared to the small indentation depth that is measured (typically sub-micrometer). High-precision measurements usually require a temperature controlled environment. The problem of thermal drift is a limiting factor when performing slow indentation measurements to measure the creep or stress relaxation behavior of materials.

In the references [2] to [10] MEMS-based measurement sensors for nanoindentation are described. MEMS-based nanoindentation sensors have the advantage that they can be produced in parallel using MEMS fabrication techniques, greatly reducing the fabrication cost. Also, they are usually very compact (mm sized) and well suited for the measurement of small forces and displacements. However, all MEMS-based design described in the references [2] to [10] naturally have a low stiffness (below 1N/µm). This low stiffness is required to be sensitive enough for the measurement of small forces in the (sub-) micronewton range. Also, even though the sensors according to the references [2] to [10] are compact and therefore feature a low thermal drift, they must be used in combination with a large-scale nanoindentation system that is affected by thermal expansion/contraction.

SUMMARY OF THE INVENTION

The goal of the present invention is to overcome the drawbacks of the known nanoindenter chips as mentioned above.

This goal is reached by a nanoindenter chip specified with the features in the main claim.

The nanoindenter chip uses a radically different approach. Instead of a single nanoindenter probe, a reference probe on the same MEMS chip is used as a reference to detect the surface of the specimen and as a reference for measuring the indentation depth. This has the advantage that the indentation system is not a part of the measurement chain any more. The (not precisely known and sometimes non-constant) frame stiffness does not influence the accuracy of the measurement. Additionally, the thermal drift is eliminated or at least reduced by 1 to 2 orders of magnitude.

The MEMS-nanoindenter chip for performing nanoindentation on a specimen according to the invention contains:
a) an intender probe joined with an indenter tip, the indenter tip indenting into the specimen;
b) a reference probe joined with a reference tip, the reference tip touching the specimen; and
c) sensing capabilities to measure the position of the indenter probe relative to the reference probe.

In reference [1] a nanoindenter measurement head is described that partially overcomes the challenges i) and ii) by using a reference tip during the nanoindentation. This means that in addition to the nanoindenter tip, a reference tip is brought in contact with the specimen. This reference tip is usually flat or rounded and does no indent into the specimen by a significant amount. Then, the relative position between the pointy indentation tip and the blunt reference tip is measured. This position measurement corresponds to the indentation depth. The drawbacks of the solution according to document [1] are the relatively complicated and expensive buildup that includes two actuators and two force sensors as well as a sensor for measuring the relative displacement between the indenter tip and the reference probe. Another drawback is that there is mm-range to cm-range between the indenter tip and the reference tip which requires the sample to be very flat and well aligned relative to the two tips. If there is an angular deviation between the tips one tip get in contact with the specimen only which results in faulty data.

For the sake of clarity a nanoindenter chip will always be understood as a MEMS-based nanoindenter chip without always repeating <<MEMS-based>> nanoindenter chip.

Other features which are considered as characteristic for the invention are set forth in the appended claims.

Although the invention is illustrated and described herein as embodied in a mems nanoindenter chip with an indenter probe and a reference probe, it is nevertheless not intended to be limited to the details shown, since various modifications and structural changes may be made therein without departing from the spirit of the invention and within the scope and range of equivalents of the claims.

The construction and method of operation of the invention, however, together with additional objects and advan-

DETAILED DESCRIPTION OF THE INVENTION

Figure 1:
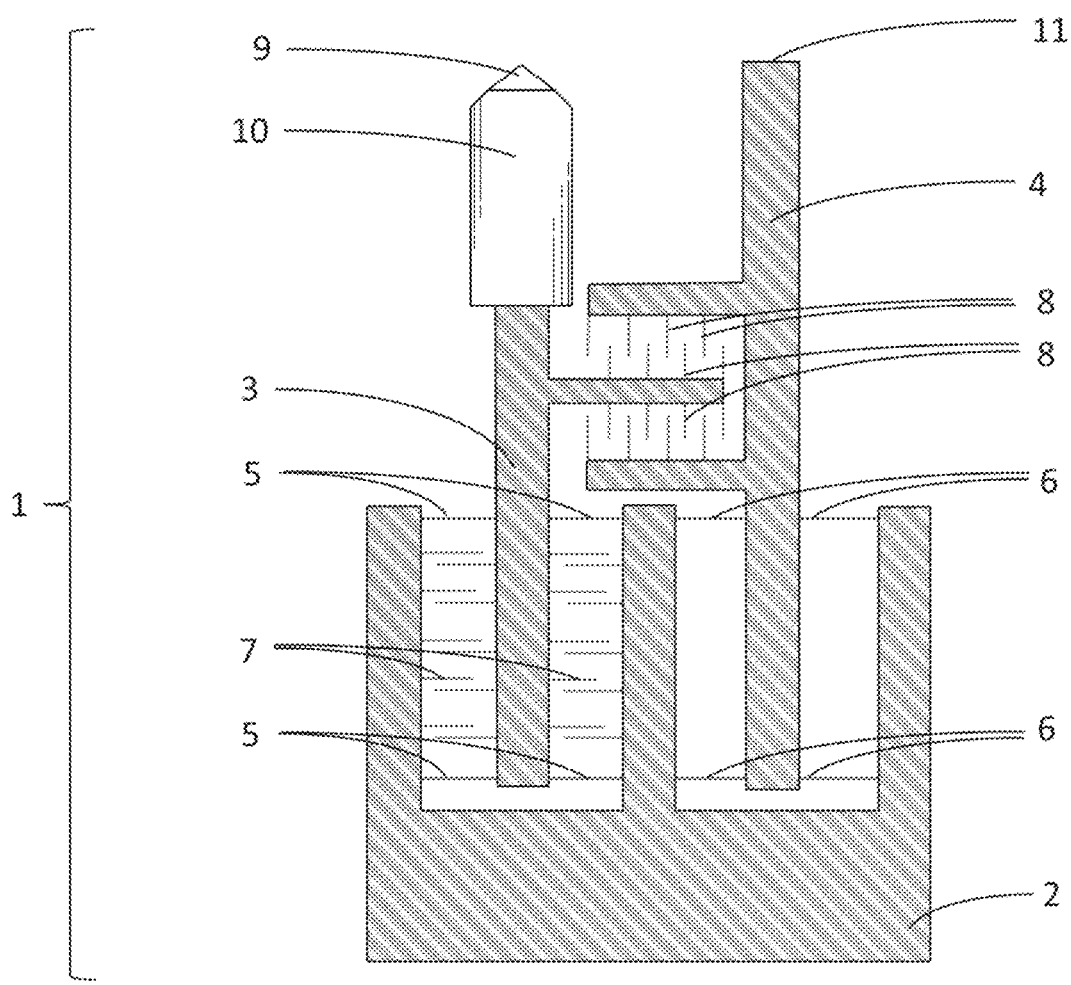
FIG. 1 is an illustration of a principal setup of a MEMS-based nanoindenter chip.

Referring now to the figures of the drawings in detail and first, particularly to FIG. 1 thereof, there is shown a MEMS-based nanoindenter chip 1. The overall size of the nanoindenter chip 1 is typically smaller than 10 mm×10 mm×1 mm. The nanoindenter chip 1 features two movable probes: The first probe is the indenter probe 3 joined with an indenter tip 9. The second probe is the reference probe 4 join with a reference tip 11. The indenter probe 3 is attached to a chip frame 2 of the indenter chip 1 by multiple indenter flexures 5. The reference probe 4 is attached to the chip frame 2 by multiple reference flexures 6. The indenter flexures 5 are configured such that the indenter probe 3 can move along its long axis when a force is applied to the indenter tip 9. Perpendicular to the long axis of the indenter probe 3 the indenter flexures 5 are stiff and therefore do not allow a significant off-axis movement of the indenter probe 3. The reference flexures 5 are configured such that the reference probe 4 can move along its long axis when a force is applied to the reference tip 11. Since the reference probe 4 is not supposed to significantly indent into a specimen 17, the reference probe tip 11 is either flat or rounded. Also, the stiffness of the indentation flexures 5 is higher than the reference flexures 6 to further reduce the unwanted indentation of the reference probe tip 11. The indenter tip 9 is typically pointier than the reference probe tip 11. Often, the indenter tip 9 is made of a hard material such as diamond, tungsten or tungsten carbide. To assemble the indenter tip 9 to the indenter probe 3, an adapter piece 10 may be required. The adapter piece 10 is usually a metal rod or a metal tube and allows for the accurate attachment and angular alignment of the indenter tip 9 to the indenter probe 3. The reference tip 11 can also be made by a sphere 23 that is assembled onto the reference probe 4, see FIG. 2.

Figure 8A:
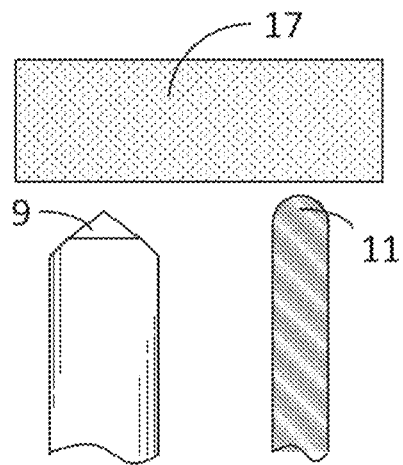
FIG. 8A to 8D illustrate a sequence of nanoidentation using an embodiment of the nanoindenter chip according to the invention.
Figure 8B:
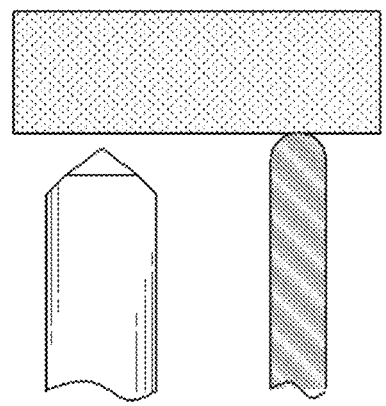
Figure 8C:
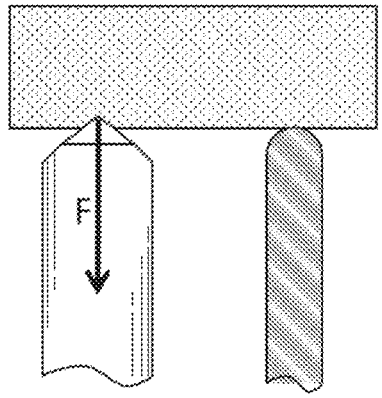

Reference is made to FIG. 8C. The reference tip 11 and the indenter tip 9 are shown during the indentation measurement. When a load F is applied to the indenter tip 9 during indentation into the specimen 17, the indenter tip 9 and consequently the probe 3 is deflected by x. The amount of deflection x is given by the stiffness k of the indenter flexures 5. The deflection of the indenter probe 3 is measured by indenter capacitor electrodes 7, see FIG. 3 and FIG. 4. A series of indenter capacitor electrodes 7 in a transverse comb drive configuration can be used for high resolution measurements. Half of the indenter capacitor electrodes 7 are a part of the chip frame 2 and the other half of the indenter capacitor electrodes 7 are a part of the indenter probe 3. Together, the indenter tip 9, the indenter probe 3, the indenter capacitor electrodes 7 and the indenter flexures 5 are used as a force sensor, however primarily the deflection is measured and the force is a derived value. This principle of capacitive measurements using electrodes in transverse configuration is described in detail in document [4]. The range of the force sensor can be easily chosen by the stiffness k of the indenter flexures 5.

When the reference tip 11 is pushed against the specimen 17, the reference probe 4 is deflected by y. The position y is measured by reference capacitor electrodes 8, see again FIG. 3 and FIG. 4. Half of the reference capacitor electrodes 8 are part of the indenter probe 3. The other half of the reference capacitor electrodes 8 are part of the reference probe 4. To enable a large measurement range for y, a lateral capacitor electrode configuration can be used as described in more detail in document [4]. When both the indenter tip 9 and the reference tip 11 are in contact with the specimen 17, the change in the position y directly corresponds to the indentation depth z.

By mounting the indenter tip 9 a few micrometers (e.g. 20 µm) behind the reference tip 11, the reference tip will always get in contact with the specimen 17 first. A suitable adapter piece 10 with the correct length and a gluing process that allow a position adjustment of the indenter tip 9 is used for this assembly step.

Due to the small, mm-range size of the MEMS-based nanoindenter chip 1, thermal drift can be greatly reduced. Even if the (large scale) rig or the actuators of the nanoindentation system are expanding/contracting, the change in the deflection y (corresponding to the indentation depth) is measured very accurately between the indenter tip 9 and reference tip 11. Also, the frame stiffness is not part of the measurement chain anymore and therefore the MEMS-based nanoindenter chip 1 enables virtually infinite frame stiffness.

Figure 2:
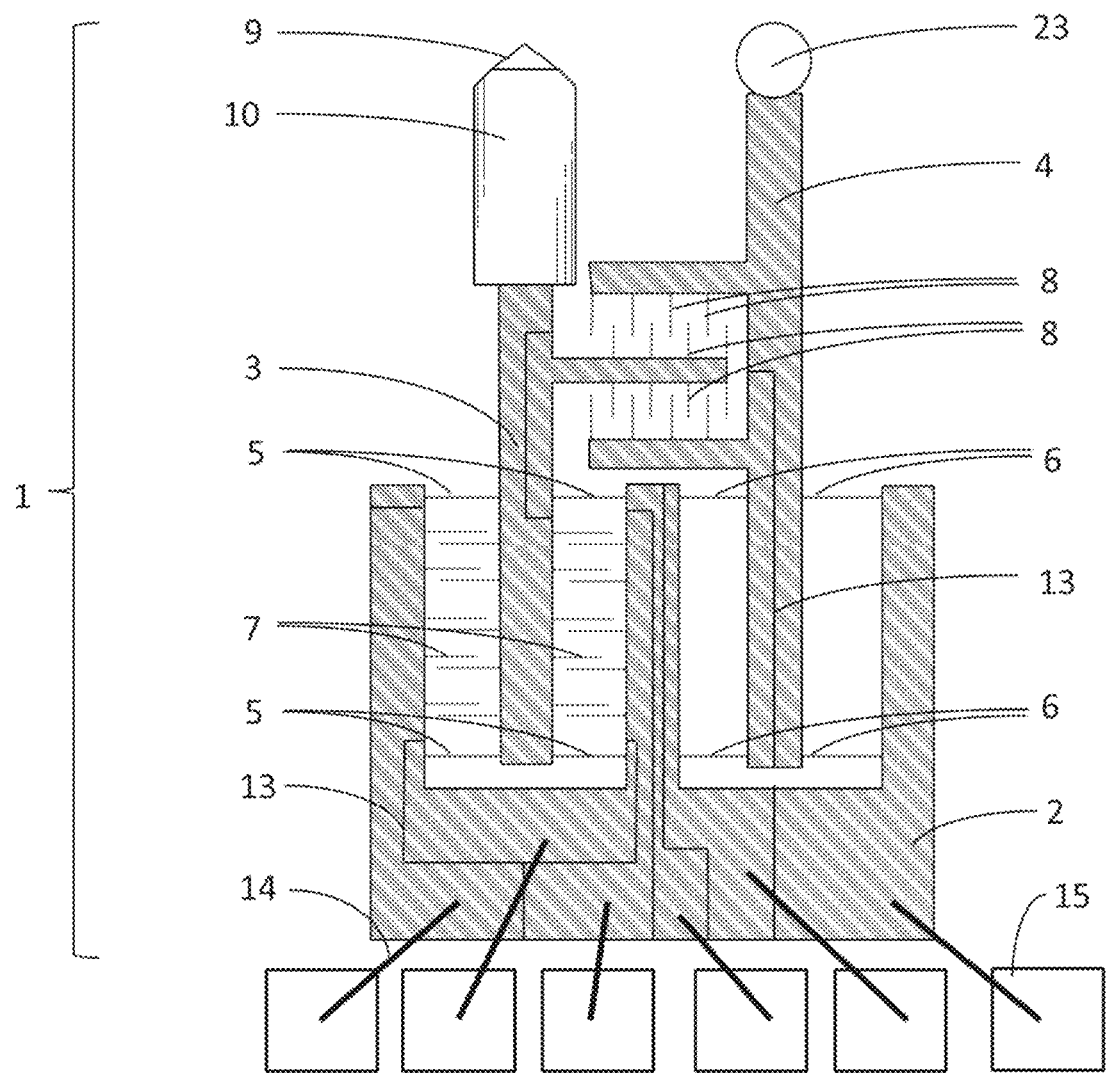
FIG. 2 is an illustration of the principal setup of the MEMS-based nanoindenter chip with connected bonding pads and a reference provided by a sphere.
Figure 5:
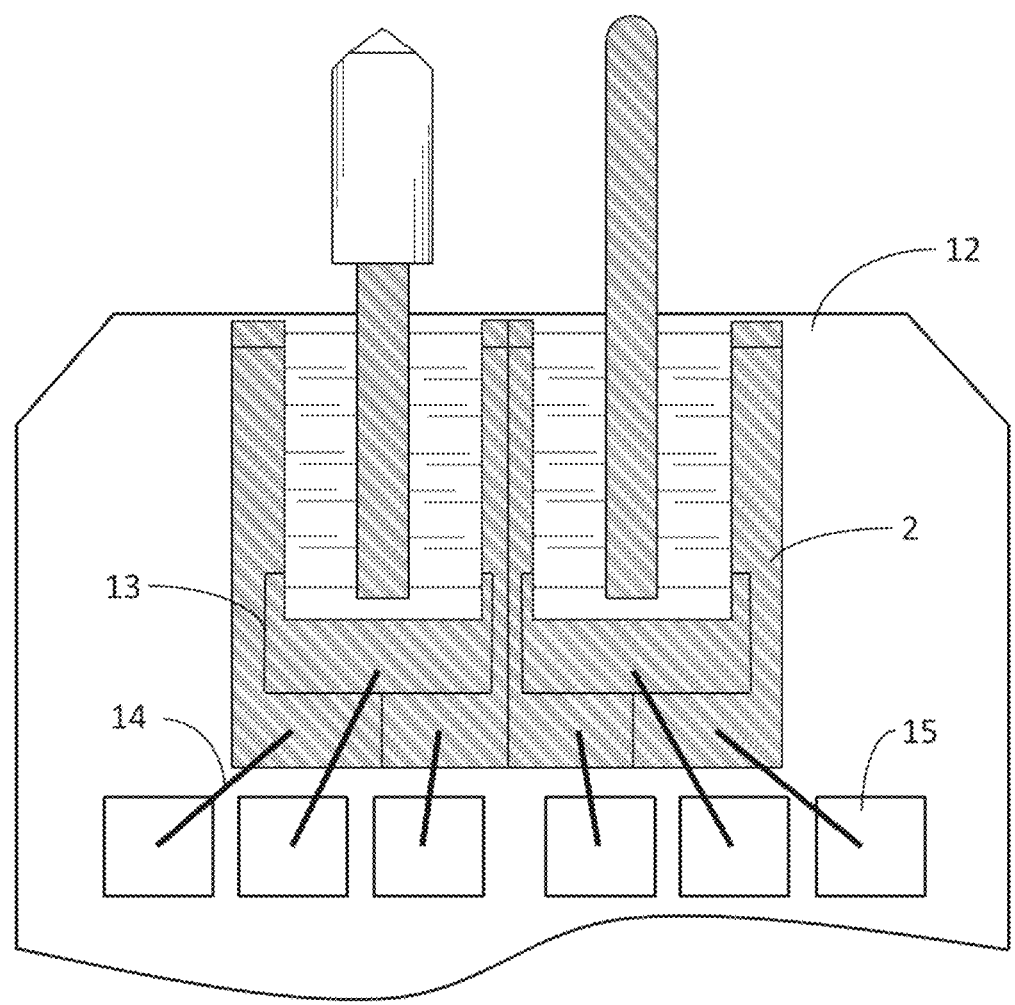
FIG. 5 is an illustration of an embodiment of the nanoindenter chip with the transverse comb drive with connected bonding pads.

The MEMS-based nanoindenter chip 1 is fabricated using a siliconon-insulator manufacturing process that is described in more detail in document [4]. To electrically insulate the individual components of the nanoindenter chip 1 from each other, trenches 13, see FIG. 2 and FIG. 5, are etched into the device layer of the wafer until reaching the burried silicon oxide layer. The capacitor electrodes 7 respectively 8 are electrically contacted using wire-bonds 14 connecting them to bond pads 15 on a substrate. The substrate is not shown in the drawings. The nanoindenter chip 1 is directly glued onto the substrate. To reduce unwanted, parasitic capacitance and electrical interference, the interface electronics 16 that converts the capacitance signal into an digital or an amplified analogue signal are directly placed onto the same substrate as the nanoindenter chip 1. Since the nanoindenter chip 1 generates two signals for the indentation force F and for the indentation depth z, a 2-channel interface is required.

Figure 6:
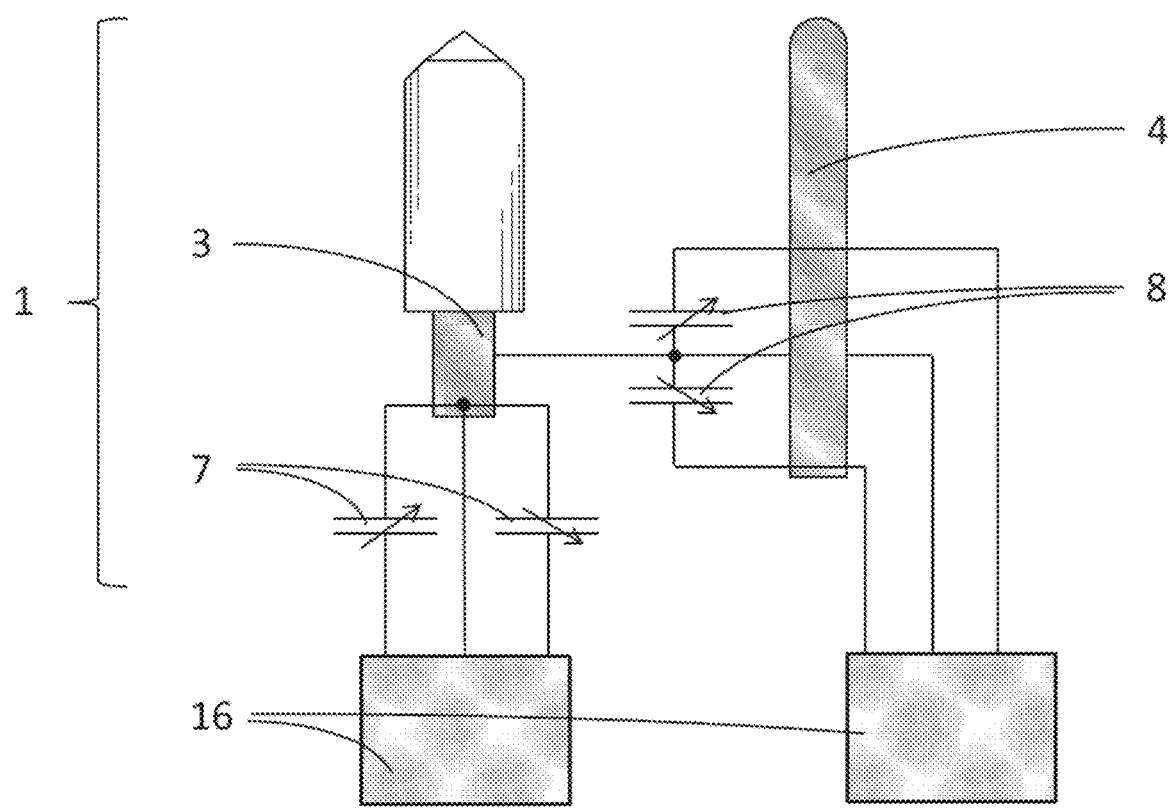
FIG. 6 is an electrical diagram of the nanoindenter chip and a 2-channel interface electronics.

FIG. 6 shows a simplified electrical diagram of the nanoindenter chip 1 and the 2-channel interface electronics 16.

Figure 3:
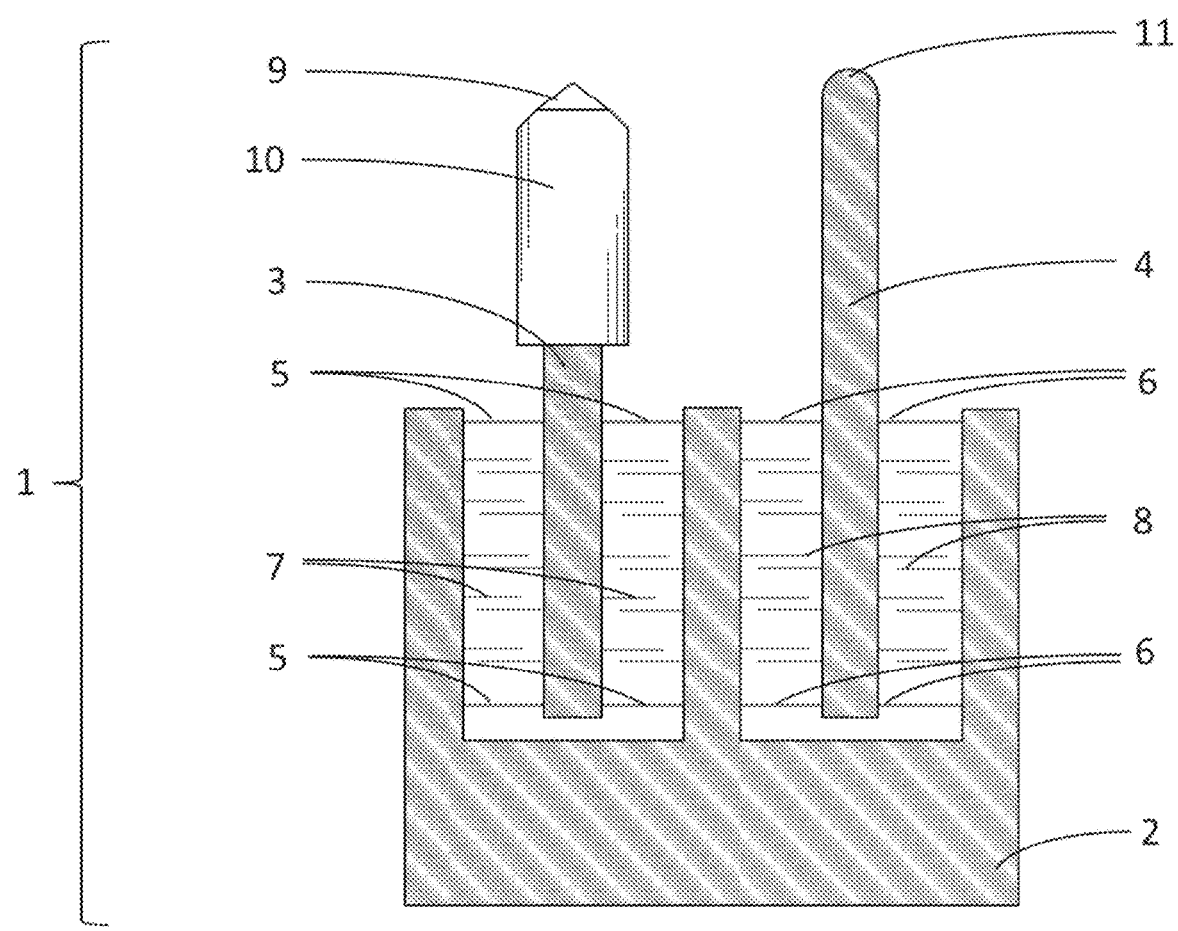
FIG. 3 is an illustration of an embodiment of the nanoindenter chip with a transverse comb drive.
Figure 4:
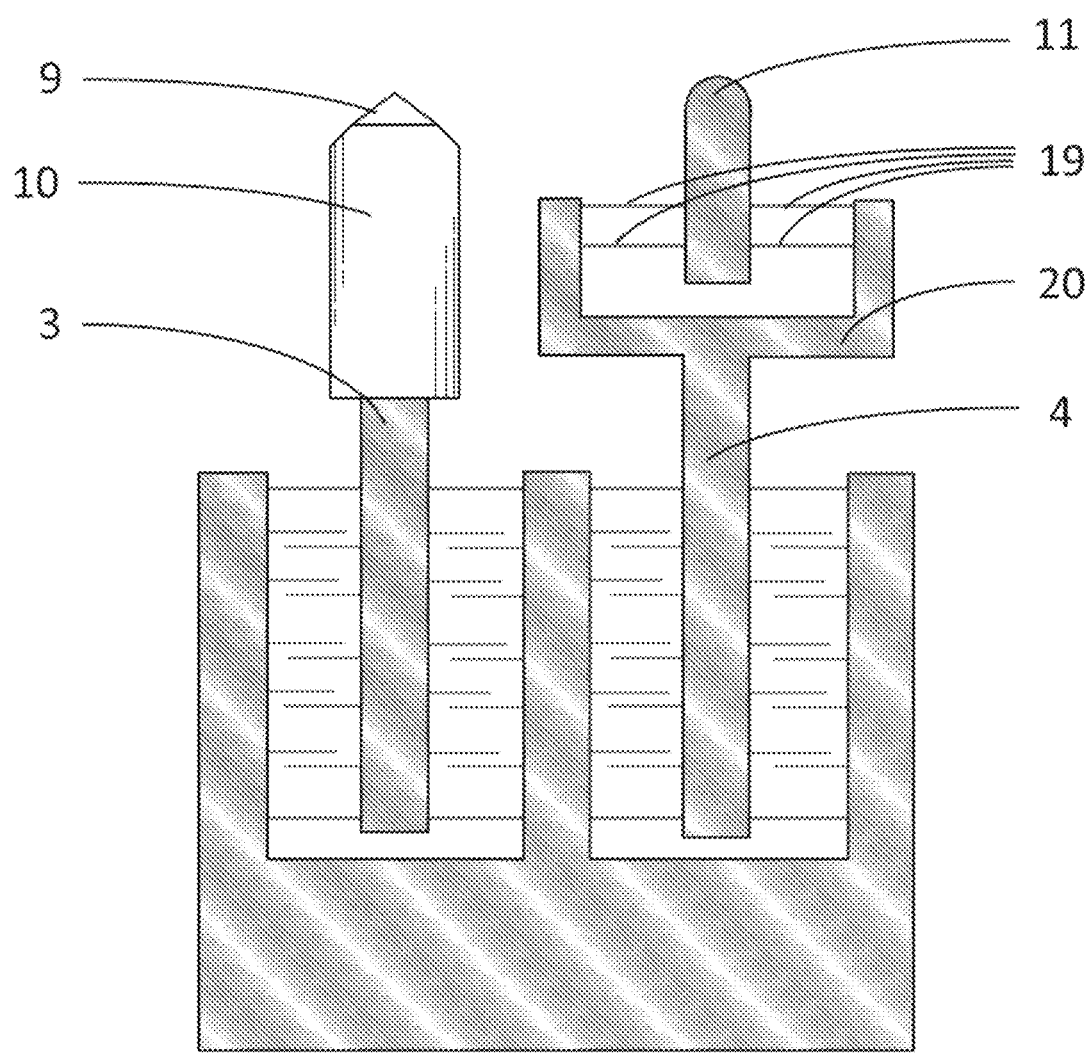
FIG. 4 is an illustration of an embodiment of the nanoindenter chip with a transverse comb drive and an additional reduction mechanism.
Figure 7:
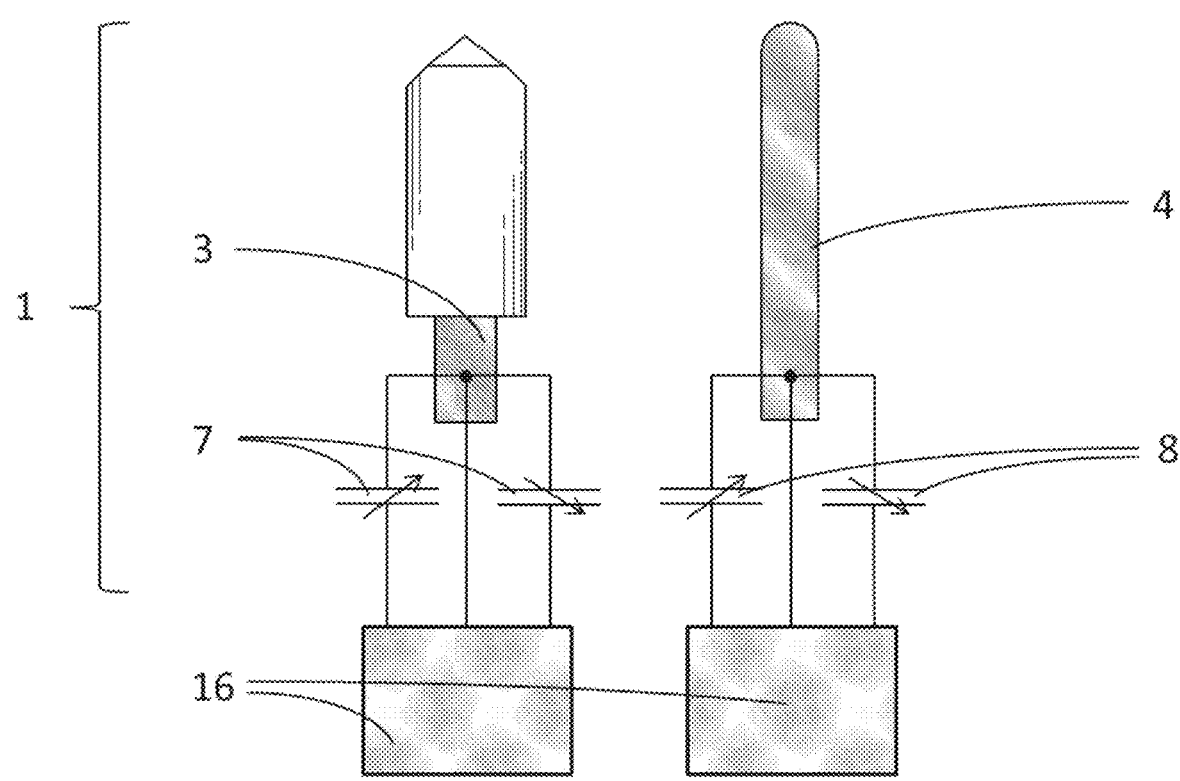
FIG. 7 is an electrical diagram of the nanoindenter chip and a 2-channel interface electronics.

FIG. 3 and FIG. 4 show a modified design of the nanoindenter chip 1 where the position y is measured between the reference probe 4 and the chip frame 2 using a transverse comb drive. The configuration according to FIG. 3 and FIG. 4 has the advantage of a more compact chip design which reduces fabrication costs. In this design the indentation depth z is calculated by subtracting y from x. To increase the sensing range for the position y, a reduction mechanism as shown in FIG. 5 may be used. The reduction mechanism consists of a u-shaped structure 20 at the end of the reference probe 4. Reduction flexures 19 are suspending the reference tip 11. FIG. 7 shows the simplified electrical diagram of the nanoindenter chip 1 and the 2-channel interface electronics 16.

The main differences to other MEMS based sensors—see documents [2] to [10] is that the nanoindenter chip 1 according to the invention includes a reference probe 4 with a reference tip 11 for the direct measurement of the indentation depth z. This design results in a virtually infinite frame stiffness, since the (large scale) nanoindentation system including the frame and actuators of the indentation system is not part of the measurement chain any more. Also, the thermal drift is greatly reduced by measuring the indentation depth z using the reference probe 4.

Document [1] is presenting a design featuring a reference probe 4. However, this design is not suitable for manufacturing using MEMS technology. The reason is that the build-up is to complex and requires multiple piezoactuators and three position/force sensors. MEMS based actuators typically cannot reach the forces required for nanoindentation in hard materials in the range >10 mN. Therefore, the nanoindenter chip 1 is a much simpler and mechanically passive MEMS device that does not require the integration of actuators. By fabricating the nanoindenter chip 1 using MEMS technology, the distance between the reference tip 11 and the nanoindenter tip 9 can be greatly reduced. This makes it possible to perform measurements on non-flat specimens 17. Due to the compactness of the nanoindenter chip 1, the drift is reduced compared to the nanoindenter chip disclosed in document [1]. Since the actuators do not have to be integrated into the nanoindenter chip 1, it can be mounted on a regular nanopositioning stage. Alternatively, the specimen 17 can be mounted on a nanopositioning stage and the nanoindenter chip 1 is mounted directly to the frame of the nanoindentation system. Furthermore document [1] discloses a design that includes three position/force readouts. The nanoindenter chip 1 only requires two readouts: the indenter capacitor electrodes 7 and the reference capacitor electrodes 8.

FIGS. 8A-8D show a sequence of a nanoindentation using the nanoindenter chip 1.

In FIG. 8A the nanoindenter chip 1 approaches the specimen 17. This can be done by either mounting the substrate 12 with the nanoindenter chip 1 on a nanoactuator or by mounting the specimen on a nanoactuator.

In FIG. 8B the nanoindenter chip 1 is pushed against the specimen 17. First, the reference tip 11 is touching the specimen 17. This occurs by mounting the nanoindenter tip 3 in a retracted position relative to the reference tip 11. Due to the flat or rounded shape of the reference tip 11 the reference tip 11 does not significantly indent into the specimen 17.

In FIG. 8C the nanoindenter tip 11 is indented into the specimen 17. The deflection x measured by the indenter electrodes 7 corresponds to the indentation load F given by the equation $$F = k \cdot x.$$

The stiffness k can be obtained during the calibration as shown in document [4]. The position signal y corresponding to the indentation depth z is measured by the reference electrodes. The design uses a capacitive sensing principle to measure x and y. However, other MEMS-based methods may be an option as well such as e.g. piezoresistive, piezoelectric or optical sensing.

Figure 8D:
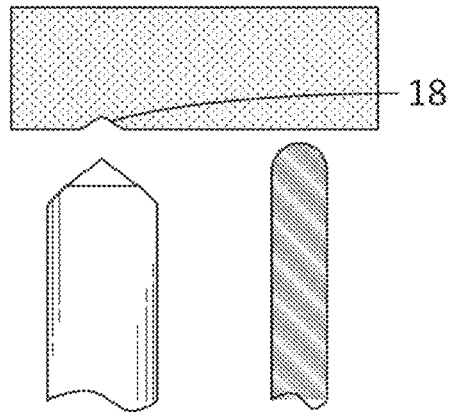

In FIG. 8D the nanoindenter chip 1 is retracted after reaching the maximum load F or indentation depth z defined by the operator.

The indentation depth z measured by the nanoindenter chip 1 and the derived indentation load F can be used to obtain a series of mechanical properties of the specimen 17 such as hardness, Young's Modulus, creep, stress relaxation, storage modulus, loss modulus, yield strength and fracture toughness. In case of creep and stress relaxation a waiting time is applied in step c) while keep either F or z constant. For the measurement of storage modulus loss modulus a cyclic load is applied for F or a cyclic indentation depth z is applied.

The following is a summary list of reference numerals and the corresponding structure used in the above description of the invention:

1 nanoindenter chip
2 chip frame
3 indenter probe
4 reference probe
5 indenter flexures
6 reference flexures
7 indenter electrodes
8 reference electrodes
9 indenter tip
10 adpater piece
11 reference tip
13 trench
14 wire-bond
15 bonding pad
16 interface electronics
17 specimen
18 indent
19 reduction flexures
20 u-shaped structure
23 sphere MEMS Micro-electromechanical systems
F load applied to nanoidenter tip during nanoindentation
x deflection of indenter probe measured by indenter electrodes
y deflection of reference probe measured by reference electrodes
z indentation depth
k stiffness of the indenter flexures

REFERENCES

[1] Measuring head for nanoindentation instrument and measuring method using same; U.S. Pat. No. 7,685,868 B2.
[2] A novel MEMS nano-tribometer for dynamic testing in-situ in SEM and TEM; A. V. Desai and M. A. Hague, Trib. Lett. 18, 13 (2005).

[3] A micromachined nanoidentation force sensor; A Nafari, A. Danilov, H. Rodjegard, P. Enoksson, and H. Olin, Sens. Actuator A 123-124, 44 (2005).

[4] A bulk microfabricated multi-axis capacitive cellular force sensor using transverse comb drives; Y. Sun, B. J. Nelson, D. P. Potasek, E. Enikov, J. Micromech. Microeng. 12, 832 (2002).

[5] MEMS Nanoindenter, Enoksson et al., U.S. Pat. No. 7,654,159.

[6] A Novel Dual-Axis Electrostatic Microactuation System for Micromanipulation; Sun et al, Proceedings of the 2002 IEEWRSJ Intl. Conference on Intelligent Robots and Systems EPFL, Lausanne, Switzerland October 2002.

[7] Micromachined Comb Drive for Quantitative Nanoindentation; Oh et al., U.S. Pat. No. 8,161,803 B2.

[8] 2-D MEMS tribometer with comb drives; Oh et al., US 2011/0265559 A1.

[9] Actuable capacitive transducer for quantitative nanoindentation combined with transmission electron microscopy; Warren et al, US 2007/0180924 A1.

[10] Design and Interface of a Microfabricated Scanning Force Sensor for Combined Force and Position Sensing; Beyeler et al, U.S. Pat. No. 9,535,086 B2.

The invention claimed is:

1. A micro-electro-mechanical systems (MEMS)-nanoindenter chip for performing nanoindentation on a specimen, the MEMS-nanoindenter chip comprising:
    an indenter probe;
    an indenter tip joined to said indenter probe, said indenter tip provided for indenting into the specimen;
    a reference probe having a u-shaped structure and reduction flexures for increasing a range of position sensing, said reduction flexures being disposed in said u-shaped structure;
    a reference tip joined to said reference probe by said reduction flexures, said reference tip provided for touching the specimen; and
    a sensor for measuring a position of said indenter probe relative to said reference probe.

2. The MEMS-nanoindenter chip according claim 1, further comprising an adapter piece for mounting said indenter tip to said indenter probe.

3. The MEMS-nanoindenter chip according to claim 1, wherein said reference tip has a flat or rounded shape.

4. The MEMS-nanoindenter chip according to claim 1, wherein said indenter tip is mounted on said indenter probe a few micrometers behind said reference tip of said reference probe such that said reference tip gets in contact with the specimen prior to said indenter tip.

5. The MEMS-nanoindenter chip according to claim 1, wherein said reference tip has a sphere being assembled onto said reference probe.

6. The MEMS-nanoindenter chip according to claim 1, further comprising indenter flexures suspending said indenter probe allowing a movement along an axis of said indenter probe.

7. The MEMS-nanoindenter chip according to claim 6, further comprising indenter reference flexures suspending said reference probe allowing a movement along an axis of said reference probe.

8. The MEMS-nanoindenter chip according to claim 7, wherein said indenter flexures are stiffer than said reference flexures.

9. The MEMS-nanoindenter chip according to claim 1, wherein:
    said sensor has interface electronics; and
    said sensor for measuring the position of said indenter probe relative to said reference probe, has indenter electrodes forming a capacitor, wherein a change of a relative position causes a change of capacitance of said capacitor which is measured by said interface electronics.

10. The MEMS-nanoindenter chip according to claim 1, wherein:
    said sensor has interface electronics; and
    said sensor for measuring the position of said indenter probe relative to said reference probe has indenter electrodes forming a first capacitor and reference electrodes forming a second capacitor, where a change of a relative position causes a change of capacitance of said first and second capacitors which is measured by said interface electronics.

11. The MEMS-nanoindenter chip according to claim 10, wherein said indenter electrodes and said reference electrodes of said first and second capacitors are disposed transverse.

12. The MEMS-nanoindenter chip according to claim 10, wherein said indenter electrodes and said reference electrodes of said first and second capacitors are disposed parallel.

13. The MEMS-nanoindenter chip according to claim 10, wherein at least one of said indenter electrodes or said reference electrodes form a differential capacitive comb drive.

* * * * *